(12) United States Patent
Mikasa et al.

(10) Patent No.: US 9,290,113 B2
(45) Date of Patent: Mar. 22, 2016

(54) RECLINING APPARATUS (71) Applicant: SHIROKI CORPORATION, Fujisawa-shi, Kanagawa (JP)

(72) Inventors: Kunihiro Mikasa, Aichi (JP); Hidehiko Fujioka, Aichi (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 311 days.

(21) Appl. No.: 13/669,878

(22) Filed: Nov. 6, 2012

(65) Prior Publication Data

US 2013/0113261 A1    May 9, 2013

(30) Foreign Application Priority Data

Nov. 8, 2011   (JP) .................................. 2011-244783

(51) Int. Cl.
*B60N 2/235* (2006.01)

(52) U.S. Cl.
CPC .................................. *B60N 2/2356* (2013.01)

(58) Field of Classification Search
USPC .......................................... 297/367 P, 367 R
See application file for complete search history.

(56) References Cited

U.S. PATENT DOCUMENTS

| 5,188,571 | A  | * | 2/1993  | Boltze et al. ................... 475/162 |
| 6,688,695 | B2 | * | 2/2004  | Pleskot .......................... 297/366 |
| 6,923,504 | B1 |   | 8/2005  | Liu et al. |
| 8,016,356 | B2 | * | 9/2011  | Mitsuhashi et al. .......... 297/366 |
| 8,033,606 | B2 | * | 10/2011 | Mitsuhashi ................... 297/362 |
| 8,460,145 | B2 | * | 6/2013  | Mitsuhashi ................... 475/162 |
| 8,708,412 | B2 | * | 4/2014  | Berndtson et al. ......... 297/367 L |
| 8,827,368 | B2 | * | 9/2014  | Leighton et al. ........... 297/367 P |
| 2002/0057008 | A1 | * | 5/2002 | Shephard ....................... 297/366 |
| 2007/0032332 | A1 | * | 2/2007 | Ito ................... 475/177 |
| 2009/0243363 | A1 | * | 10/2009 | Tarusawa et al. .......... 297/367 P |
| 2009/0284063 | A1 | * | 11/2009 | Quast et al. ................... 297/366 |
| 2010/0033004 | A1 | * | 2/2010 | Reubeuze .................. 297/367 P |

FOREIGN PATENT DOCUMENTS

| CN | 101084134 A | 12/2007 |
| EP | 2 213507 A2 | 8/2010 |
| JP | H 1-169149 U | 11/1989 |
| JP | 8-19442 | 1/1996 |
| JP | 2002-101993 A | 4/2002 |
| JP | 2004-105637 A | 4/2004 |

OTHER PUBLICATIONS

Chinese Office Action dated Nov. 2, 2014 with English Translation.
Japanese Office Action dated Jul. 7, 2015.

* cited by examiner

*Primary Examiner* — David R Dunn
*Assistant Examiner* — Timothy J Brindley
(74) *Attorney, Agent, or Firm* — McGinn IP Law Group, PLLC.

(57) ABSTRACT

A reclining apparatus achieves enhanced ease of coming off of a pole from a ratchet plate and hence a better operational feeling. Of a plurality of external teeth of a pole, at least one external tooth from an end is formed in such a manner that a tooth thickness is lessened more toward a tooth tip in comparison with a tooth thickness of other external teeth. The external tooth having a lessened tooth thickness is cut in one of two tooth planes located on a side of the end. The cut tooth plane has an inclined surface parallel to a flat surface containing all tangential lines to a pitch circle of one of two tooth planes of an external tooth having a large tooth thickness and situated adjacent to the external tooth having a lessened tooth thickness located on a side of the external tooth having a lessened tooth thickness.

3 Claims, 12 Drawing Sheets

PRIOR ART

FIG. 12

PRIOR ART

RECLINING APPARATUS

BACKGROUND OF THE INVENTION

1. Field of the Invention

The present invention relates to a reclining apparatus switched to a locked state by meshing of internal teeth and external teeth.

2. Background Art

Figure 11:
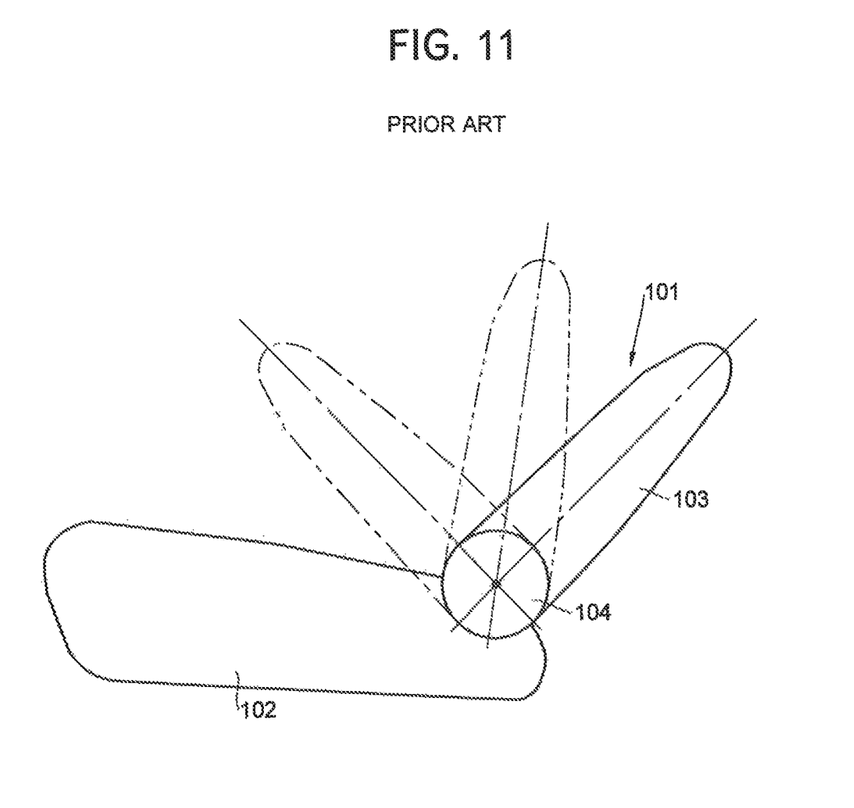
FIG. 11 is a view showing a configuration of a seat.
Figure 12:
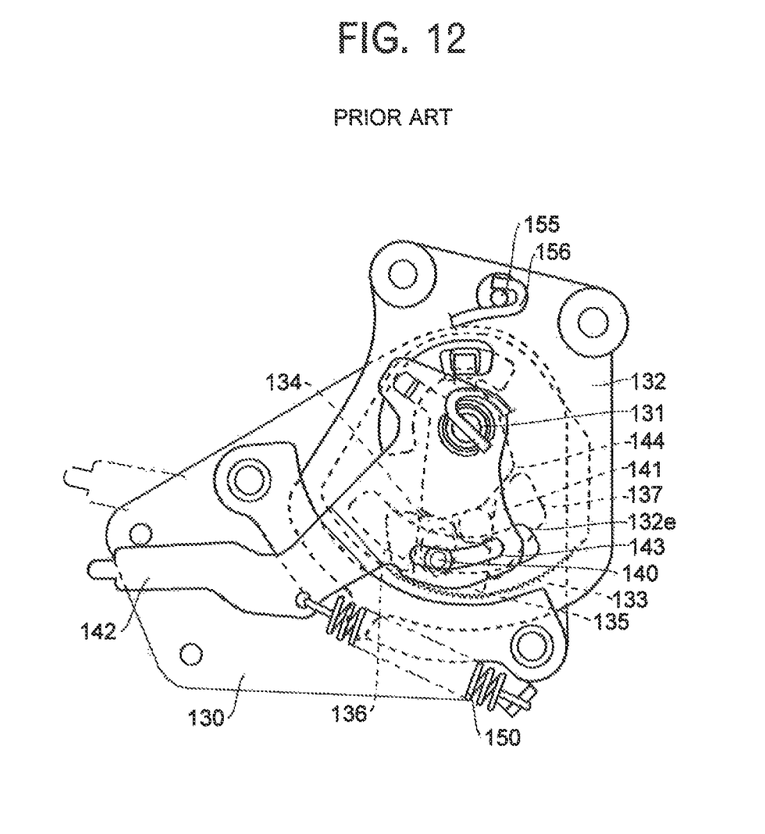
FIG. 12 is a side view of a reclining apparatus for vehicle seat in the related art.

A description will be given using FIG. 11 and FIG. 12. FIG. 11 is a view showing a configuration of a seat and FIG. 12 is a side view of a reclining apparatus for vehicle seat in the related art.

As is shown in FIG. 11, a seat 101 is formed of a seat cushion 102 that supports the buttocks of a seat occupant and a seat back 103 that supports the back of the seat occupant. The seat back 103 is provided to be reclinable back and forth with respect to the seat cushion 102. A reclining mechanism 104 is provided on an axis of rotation for reclining of the seat back 103 to allow and inhibit the reclining of the seat back 103.

The reclining apparatus 104 will be described using FIG. 12. Referring to the drawing, a hinge pin 131 is provided to stand on a lower arm plate 130 to be installed on the seat cushion side. A ratchet plate 132 to be installed on the seat back side is provided to the hinge pin 131 in a rotatable manner. A recess portion having a circular-arc surface about the hinge pin 131 is formed at a bottom portion of the ratchet plate 132 and a plurality of internal teeth 133 are formed in the circular-arc surface in a circumferential direction.

A pole 134 is disposed between the lower arm plate 130 and the ratchet plate 132. A plurality of external teeth 135 that can mesh with the internal teeth 133 are provided to the pole 134 in a surface opposing the circular-arc surface of the ratchet plate 132.

On the other hand, the lower arm plate 130 is provided with guides 136 and 137 that guide the pole 134 in a radial direction of a circle about the hinge pin 131 from a locked position at which the external teeth 135 mesh with the internal teeth 133 to an unlocked position at which the external teeth 135 do not mesh with the internal teeth 133 and vice versa.

A release arm 142 provided to the hinge pin 131 in a rotatable manner is provided with a long hole 143 in which to engage a pin 140 of the pole 134 penetrating through an arc-like long hole 132e provided to the ratchet plate 132 about the hinge pin 131. A shape of the long hole 143 is set to have a portion close to the internal teeth 133 of the ratchet plate 132 and a portion remote from the internal teeth 133 for the pole 134 to move in the radial direction of the circle about the hinge pin 131 in association with rotations of the release arm 142, so that the external teeth 135 of the pole 134 mesh or do not mesh with the internal teeth 133 of the ratchet plate 132.

A first cam 144 is attached to the hinge pin 131 in a rotatable manner.

A second cam 141 is provided between a slope of the pole 134 on a side opposite to the side where the external teeth 135 are formed and the first cam 144. The slope of the pole 134 is a surface that crosses the radial direction of the circle.

The release arm 142 is given with a pushing force in a direction in which the first cam 144 presses the pole 134 via the second cam 141 by a spring 150 latched to the release arm 142 at one end and latched to the lower arm plate 130 at the other end.

Also, a groove is formed in an end face of the hinge pin 131. An inner end of a spiral spring 156 having an outer end latched to a pin 155 having an outer end provided to stand on the ratchet plate 132 is latched in this groove to push the ratchet plate 132 (upper arm) in a forward reclining direction.

An operation of the configuration above will now be described. A state shown in FIG. 12 is a state where the first cam 144 pushes the pole 134 via the second cam 141 that abuts on each of the slope of the first cam 144, the guide 137, and the pole 134 and the external teeth 135 of the pole 134 mesh with the internal teeth 133 of the ratchet plate 132, so that rotations of the ratchet plate 132 are inhibited to lock the reclining of the seat back 103.

When the release arm 142 located at a position indicated by a solid line is rotated to a position indicated by an alternate long and two short dashes line against a pushing force of the spring 150 in this state, the first cam 144 engaged with the release arm 142 starts to rotate in the same direction. Accordingly, the state where the first cam 144 pushes the pole 134 via the second cam 141 is released.

The pole 134 having the pin 140 engaged in the long hole 143 of the release arm 142 is also guided by the guides 136 and 137 and moves in the direction to the hinge pin 131. Accordingly, the meshing state of the external teeth 135 of the pole 134 and the internal teeth 133 of the ratchet plate 132 is released and the ratchet plate 132 (seat back 103) is switched to a reclinable state.

The seat occupant thus reclines the seat back 103 as he desires and releases an operation force of the release arm 142 when a desired reclining angle is obtained. Then, the release arm 142 returns to the position indicated by a solid line from the position indicated by an alternate long and two short dashes line due to a pushing force of the spring 150. The first cam 144 therefore rotates in an opposite direction to the direction of the last time and returns to the state of FIG. 12. An example is described, for example, in JP-A-08-019442.

However, tooth marks of a plurality of the external teeth 135 formed in the pole 134 are all, of a same shape. Hence, an angle yielded between tooth planes (planes of the external teeth 135 meshing with the internal. teeth 133) of the external teeth 135 at and near the end and a moving direction of the pole 134 becomes smaller.

When the seat occupant is reclining on the seat back 103, a load is transmitted to the pole 134 via the ratchet. plate 132. In this instance, a component force to the moving direction of the pole 134 becomes smaller for an input to the external teeth 135 at and near the end of the pole 134 from the internal teeth 133 of the ratchet plate 132. This raises a problem that releasing of the meshing state of the external teeth 135 of the pole 134 and the internal teeth 133 of the ratchet plate 132 (hereinafter, referred to as ease of coming off of the pole 134 from the ratchet plate 132) is deteriorated.

SUMMARY OF THE INVENTION

The invention was devised in view of the problem discussed above and has an object to provide a reclining apparatus with which ease of coming off of a pawl from a ratchet plate is enhanced and therefore a better operational feeling is obtained.

In order to achieve the object above, a reclining apparatus according to one aspect of the invention includes: a base plate; a ratchet plate that is placed on the base plate in a rotatable manner and provided with a recess portion having a circular-arc surface about a center axis of rotation in a surface opposing the base plate, internal teeth being formed in the circular-arc surface of the recess portion in a circumferential direction; a pawl that is disposed in the recess portion of the ratchet plate and provided with a plurality of external teeth in a surface opposing the circular-arc surface so as to mesh with the internal teeth, at least one of the plurality of external teeth from an end being formed in such a manner that a tooth thickness is lessened more toward a tooth tip in comparison with a tooth thickness of other external teeth; and a guide that is provided to the base plate to guide the pawl in a radial direction of a circle about the center axis of rotation from a locked position at which the external teeth mesh with the internal teeth to an unlocked position at which the external teeth do not mesh with the internal teeth and vice versa. The external tooth formed to have a lessened tooth thickness is cut in one of two tooth planes located on a side of the end. Also, the cut tooth plane has an inclined surface parallel to a flat surface containing all tangential lines to a pitch circle of one of two tooth planes of an external tooth having a large tooth thickness and situated adjacent to the external tooth having a lessened tooth thickness located on a side of the external tooth having a lessened tooth thickness.

Herein, the term, "tooth plane", means a plane where the external tooth and the internal tooth engage with each other.

According to the reclining apparatus configured above, of the plurality of external teeth of the pawl, at least one external tooth from the end is formed in such a manner that a tooth thickness is lessened more toward the tooth tip in comparison with a tooth thickness of the other external teeth. The external tooth having a lessened tooth thickness is cut in one of two tooth planes located on the end side. The cut tooth plane has the inclined surface parallel to the flat surface containing all the tangential lines to the pitch circle of one of the two tooth planes of the external tooth having a large tooth thickness and situated adjacent to the external tooth having a lessened tooth thickness located on the side of the external tooth having a lessened tooth thickness. Owing to this configuration, an angle yielded between the cut tooth plane of the external tooth at the end of the pawl and a moving direction of the pawl is increased. That is to say, a component force to the moving direction of the pawl is increased for an input to the external teeth at and near the end of the pawl from the internal teeth of the ratchet plate. Hence, the meshing state of the external teeth of the pawls and the internal teeth of the ratchet plate is released more smoothly, that is, ease of coming off of the pawl from the ratchet plate is enhanced and therefore a better operational feeling is obtained.

The foregoing and other objects, features, aspects, and advantages of the present invention will become more apparent from the following detailed description of the present invention when taken conjunction with the accompanying drawings.

DESCRIPTION OF THE PREFERRED EMBODIMENTS

Embodiments of the invention will be described using the drawings.

Overall Configuration

Figure 1:
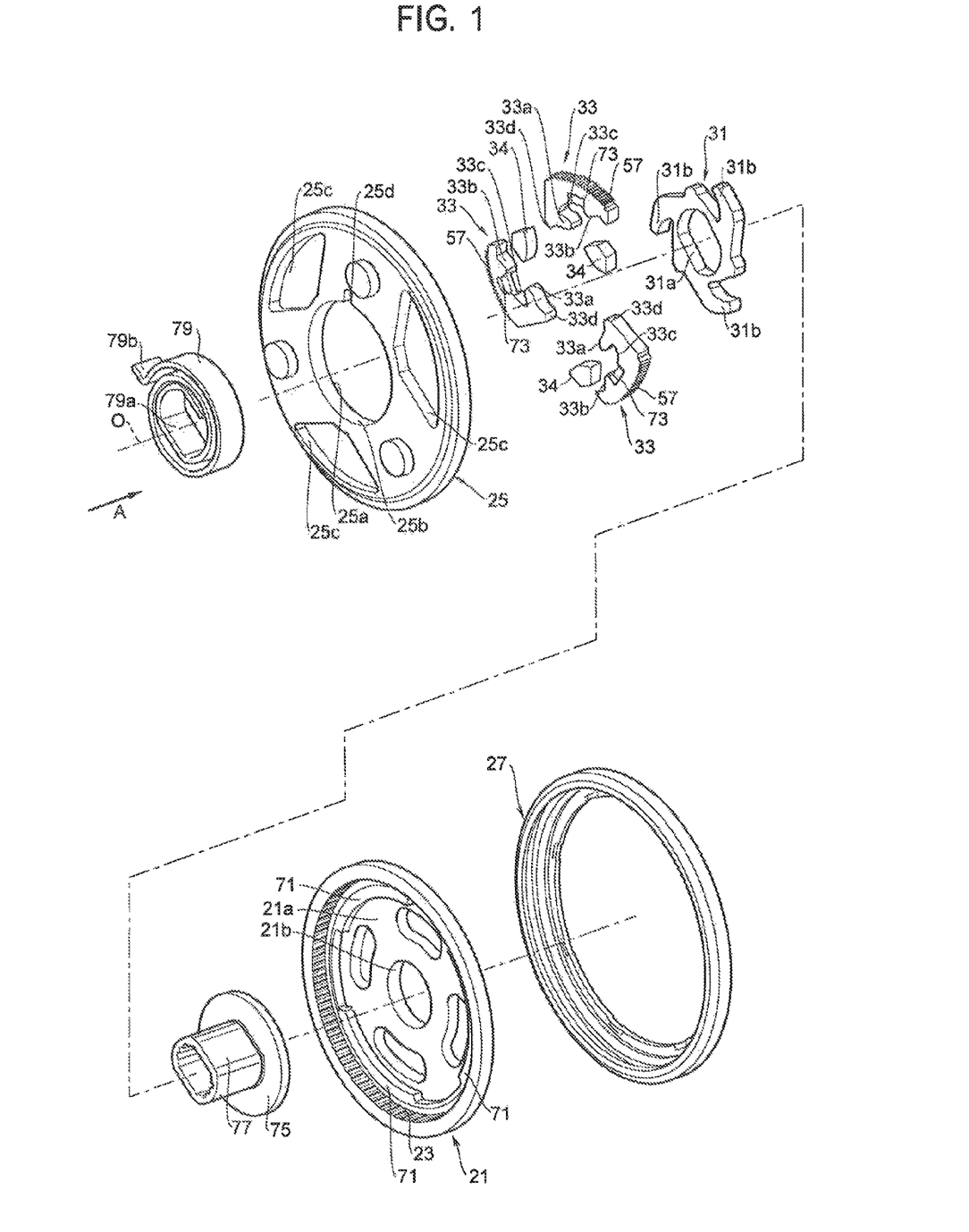
FIG. 1 is an exploded perspective view of a reclining apparatus according to one embodiment of the invention.
Figure 4:
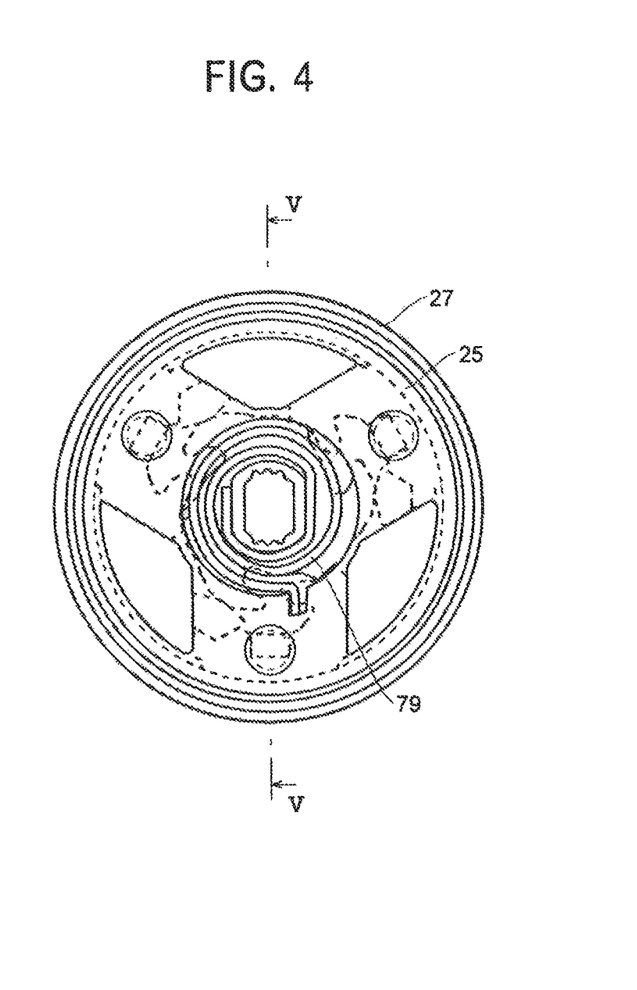
FIG. 4 is a perspective view of a ratchet of FIG. 1 when viewed in a direction indicated by an arrow A.
Figure 5:
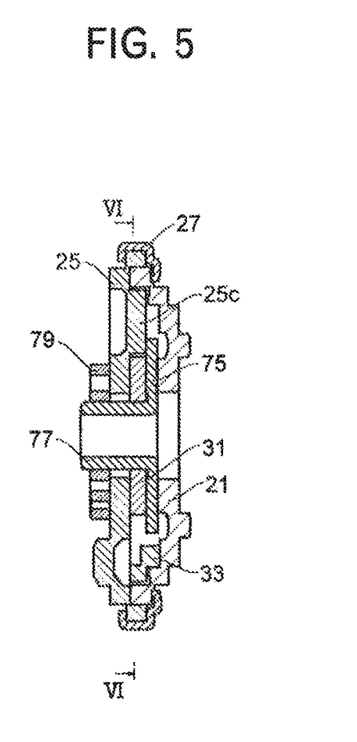
FIG. 5 is a cross section taken on the line V-V of FIG. 4.
Figure 6:
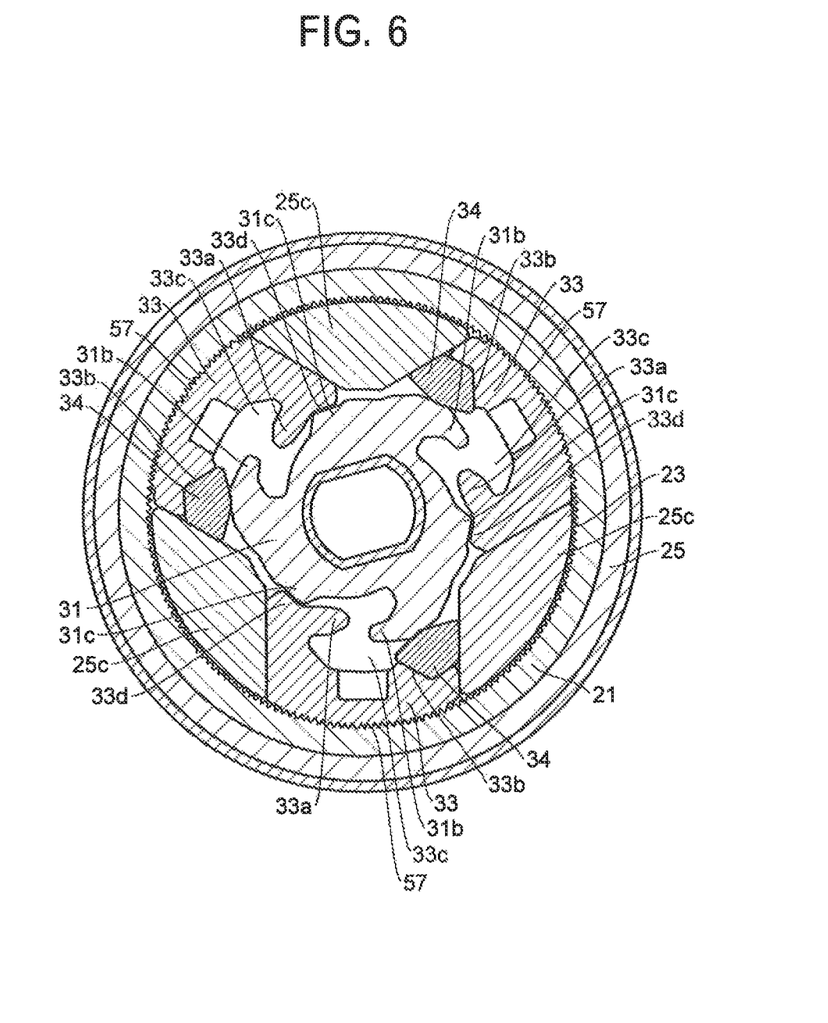
FIG. 6 is a cross section taken on the line VI-VI of FIG. 5 used to describe a state where the pawls are in a locked state.
Figure 7:
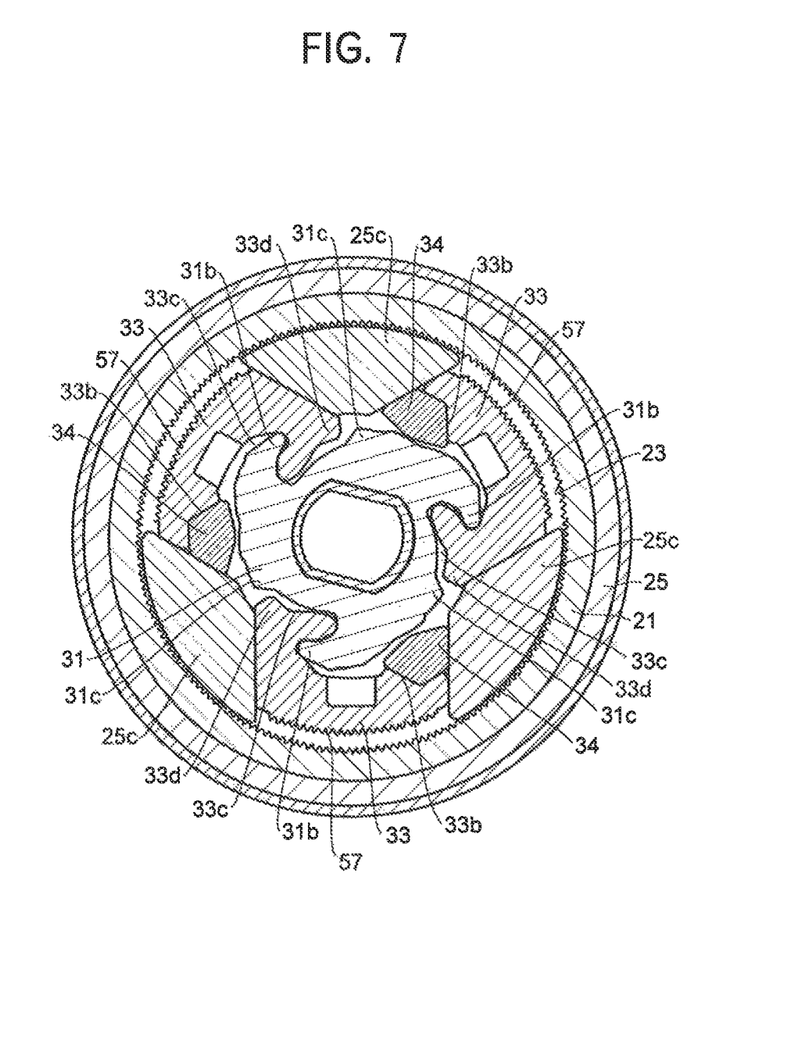
FIG. 7 is a view used to describe a full open state (a state where the pawls are at an unlocked position) in the cross section of FIG. 6.

An overall configuration of a relining apparatus of one embodiment will be descried using FIG. 1 and FIG. 4 through FIG. 7. FIG. 1 is an exploded perspective view of the reclining apparatus of this embodiment. FIG. 4 is a perspective view of a ratchet of FIG. 1 when viewed in a direction indicated by an arrow A. FIG. 5 is a cross section taken on the line V-V of FIG. 4. FIG. 6 is a cross section taken on the line VI-VI of FIG. 5 used to describe a state where pawls are at a locked position. FIG. 7 is a view used to describe a full open state (a state where the pawls are at an unlocked position) in the cross section of FIG. 6.

The reclining apparatus of this embodiment is, as with the reclining apparatus 104 shown in FIG. 11, provided on an axis of rotation for reclining of the seat back 103.

Referring to FIG. 1, a ratchet plate 21 to be installed on a seat back side is of a bottomed-cylindrical shape having one surface as an opening surface formed by subjecting a disc-shaped plate material to half blanking by pressing. Internal teeth 23 are formed all along an inner cylindrical surface (circular-arc surface) of the bottomed-cylinder (recess portion) of the ratchet plate 21 in a circumferential direction. Also, a hole 21b penetrating through a bottom portion 21a is formed at a center.

A base plate 25 to be installed on a seat cushion side is also of a bottomed-cylindrical shape having one surface as an opening surface formed by subjecting a disc-shaped plate material to half blanking by pressing. A diameter of a bottom portion 25a of this bottomed-cylinder is set slightly larger than an outside diameter of the ratchet plate 21. The ratchet plate 21 is fit into the bottom portion 25a and the base plate 25 and the ratchet plate 21 are allowed to rotate relatively to each other. Also, a hole 25b penetrating through the base plate 25 is formed at a center.

As is shown in FIG. 5, an outer peripheral portion of the ratchet plate 21 and an outer peripheral portion of the base plate 25 are pinched by a ring-like outer peripheral ring 27. Accordingly, the ratchet plate 21 and the base plate 25 are maintained in a relatively rotatable manner without being separated in an axial direction of relative rotation (indicated by an arrow O in FIG. 1).

Referring to FIG. 1 again, a rotation cam (first cam) 31 is disposed in a space defined by the bottom portion 21a of the ratchet plate 21 and the bottom portion 25a of the base plate 25. A non-circular (oval) through-hole 31a is formed at a center of the rotation cam 31.

Also, three pawls 33 are disposed in the space defined by the bottom portion 21a of the ratchet plate 21 and the bottom portion 25a of the base plate 25 to be located on the outside of the rotation cam 31. Each pawl 33 has external teeth 57 that can mesh with the internal teeth 23.

Also, as is shown in FIG. 6, the base plate 25 is provided with guides 25c that guide the respective pawls 33 in a radial direction of the axis of relative rotation. Each pawl 33 is therefore allowed to move in the radial direction of the axis of relative rotation.

Also, cams (second cams) 34 are provided among the pawls 33, the rotation cam 31, and the guides 25c.

Referring to FIG. 1 again, each pawl 33 is provided with a recess portion 33c that extends in a direction crossing the radial direction of the axis of relative rotation and a hook portion 33a on a side opposite to the surface in which the external teeth 57 are formed.

On the other hand, three hook portions 31b allowed to come into the recess portions 33c of the respective pawls 33 are provided to the rotation cam 31 along the circumferential portion. Also, a lock surface 33b on which the cam 34 is allowed to abut is provided to each pawl 33 in a surface opposite to the surface in which the external teeth 57 are formed. The lock surface 33b is set to a surface that crosses the radial direction of the axis of relative rotation and in which a force pressing the owl 33 against the guide 25c and a force moving the pawl 33 in a direction in which the external teeth 57 mesh with the internal teeth 23 (the radial direction of the axis of relative rotation) are generated when pressed by the cam 34.

Further, the hook portion 33a of the pawl 33 is provided with a rotation cam abutting portion 33d on which a cam abutting portion 31c provided to the rotation cam 31 in a portion other than the hook portion 31b is allowed to abut.

Then, as is shown in FIG. 6, when the rotation cam 31 rotates in one direction (a counterclockwise direction in the drawing), the hook portions 31b of the rotation cam 31 are pressed against the corresponding cams 34. The cams 34 are thus pressed against the corresponding guides 25c and the lock surfaces 33b of the corresponding pawls 33 and force the pawls 33 to move in a direction moving away from the axis of relative rotation. Accordingly, each pawl 33 comes to a locked position at which the external teeth 57 mesh with the internal teeth 23 of the ratchet plate 21.

In this instance, clearances are generated between the cam abutting portions 31c of the rotation cam 31 and the rotation cam abutting portions 33d of the respective pawls 33.

In this embodiment, an unlock maintaining mechanism is provided. The unlock maintain mechanism is formed of three arc-like guides 71 provided to the ratchet plate 21 along the circumferential direction in an inner cylindrical surface on a side closer to the bottom portion 21a than the internal teeth 23 and protrusions 73 provided to the respective pawls 33 on surfaces opposing the bottom portion 21a of the ratchet plate 21 by half blanking.

When the protrusions 73 of the respective pawls 33 abut on the corresponding arc-like guides 71, the pawls 33 are maintained at the unlocked position at which meshing of the external teeth 57 and the internal teeth 23 of the ratchet plate 21 is released.

An operation shaft 77 of a non-circular shape (oval shape) in cross section that rotates integrally with the rotation cam 31 fits into the non-circular through-hole 31a of the rotation shaft 31. A flange portion 75 is provided to an outer peripheral surface of the operation shaft 77 all along in a circumferential direction of the outer peripheral surface in such a manner so as to overhang from the operation shaft 77 in a radial direction and thereby to inhibit the operation shaft 77 from tilting in any direction with respect to the bottom portion 21a of the ratchet plate (first member) 21 by abutting on the bottom portion 21a of the ratchet plate 21. The flange portion 75 of this embodiment is formed of a single continuous flange provided to the outer peripheral surface of the operation shaft 77 all along in the circumferential direction. It should be appreciated, however, that the flange portion 75 may be formed of a plurality of discontinuous separate flanges. In this case, in order to inhibit the operation shaft 77 from tilting in any direction with respect to the bottom portion 21a of the ratchet plate (first member) 21, it is sufficient to set an angle of a gap in the circumferential direction between one flange and the adjacent flange to be less than 180 degrees.

Further, the operation shaft 77 is set to a height long enough to be exposed to the outside from the hole 25b penetrating through the base plate 25.

Also, a spiral spring 79 obtained by processing a long spring plate material into a spiral shape is installed in the hole 25b penetrating through the base plate 25. An inner end 79a of the spiral spring 79 is wound around and latched to the operation shaft 77 and an outer end is latched to a notch portion 25d formed in a peripheral surface of the hole 25b penetrating through the base plate 25. The pawls 33 are pushed in a direction to the locked position by a pushing force of the spiral spring 79 via the rotation cam 31.

An operation of the reclining apparatus of this embodiment will now be described.

As is shown in FIG. 6, in a case where an operation force is not applied to the rotation cam 31, the rotation cam 31 rotates in one direction (a counterclockwise direction in the drawing) due to a pushing force of the spiral spring 79. Hence, the hook portions 31b of the rotation cam 31 are pressed against the lock surfaces 33b of the respective pawls 33 via the corresponding cams 34. As has been described above, when the lock surfaces 33b of the pawls 33 are pressed, a force that forcedly move the pawls 33 in a direction (the radial direction of relative rotation) in which the external teeth 57 mesh with the internal teeth 23 is generated. Accordingly, the pawls 33 come to the locked position at which the external teeth 57 of the pawls 33 mesh with the internal teeth 23 of the ratchet plate 21. Hence, relative rotation of the ratchet plate 21 and the base plate 25 is inhibited and the seat back is in a state (locked state) where the seat back is not allowed to rotate with respect to the seat cushion. Further, because a force that presses the pawls 33 against the corresponding guides 25c is generated, rattling between the pawls 33 and the guides 25c is eliminated.

When the rotation cam 31 (operation shaft 77) rotates in the other direction (clockwise direction in the drawing) against a pushing force of the spiral spring 79 while the pawls 33 are at the locked position, the hook portions 31b of the rotation cam 31 come into the recess portions 33c of the respective pawls 33 and engage with the hook portions 33a of the respective pawls 33 (by being pressed against inner wall surfaces of the recess portions 33c on a side of the rotation center of relative rotation). Thus, the pawls 33 are hooked up in a direction coming closer to the axis of relative rotation and come to the unlocked position (full open state) shown in FIG. 7 at which meshing between the external teeth 57 of the pawls 33 and the internal teeth 23 of the ratchet plate 21 is released. Hence, the ratchet plate 21 and the base plate 25 are allowed to rotate relatively to each other and therefore the seat back is allowed to rotate with respect to the seat cushion.

Detailed Description of External Teeth of Pawls

Figure 2:
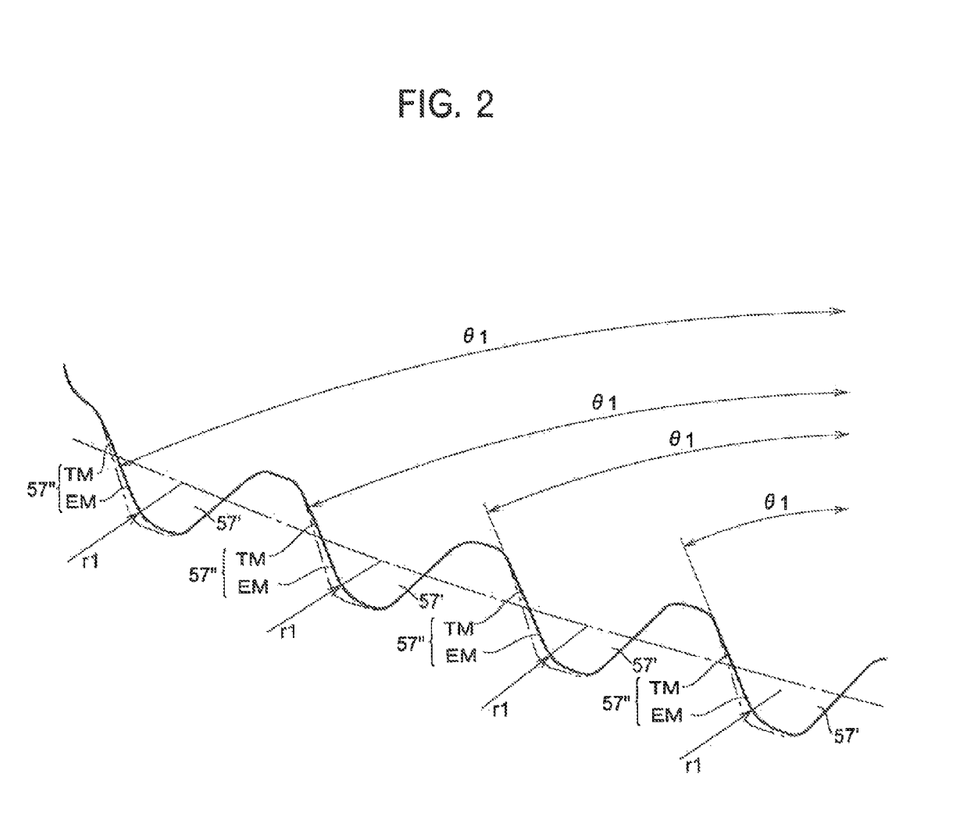
FIG. 2 is an enlarged view of a portion II of FIG. 3 used to describe external teeth of a pawl of FIG. 1.
Figure 3:
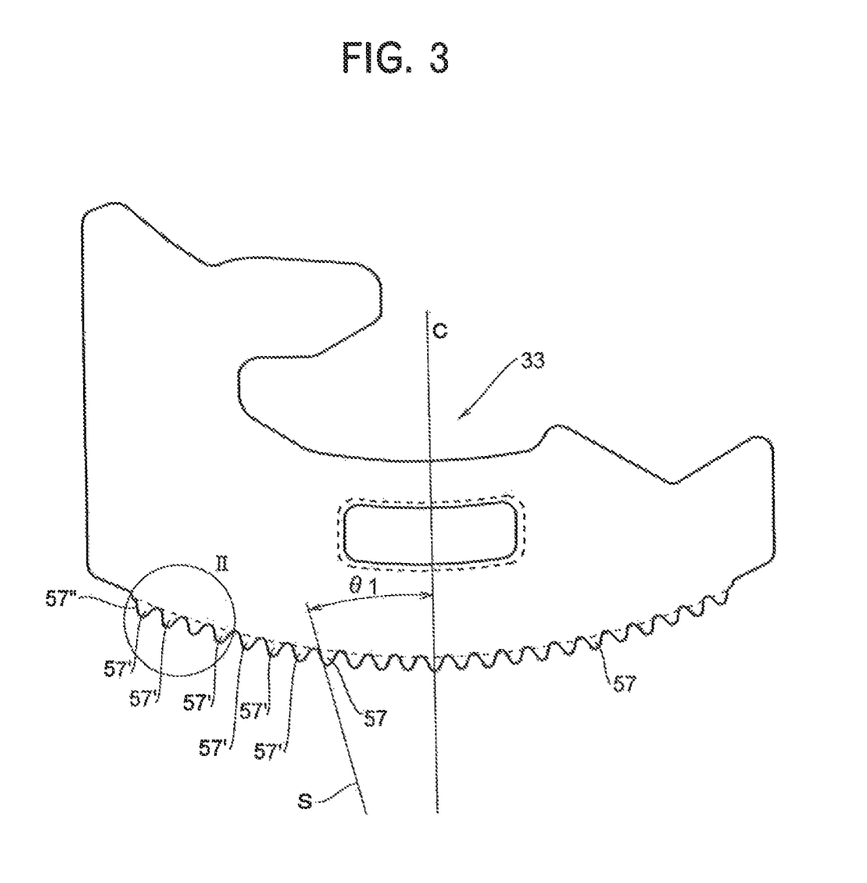
FIG. 3 is an enlarged view of the pawl of FIG. 1.

A shape of the external teeth of the pawls of this embodiment will now be described using FIG. 2 and FIG. 3. FIG. 2 is an enlarged view of a portion II of FIG. 3 used to describe the external teeth of the pawl of FIG. 1. FIG. 3 is an enlarged view of the pawl of FIG. 1.

As is shown in FIG. 2, in this embodiment, of the external teeth 57 of the pawl 33, n1 external teeth 57' from the end are formed in such a manner that a tooth thickness (a tooth thickness in a chord direction on a same circumference) is lessened more toward a tooth tip in comparison with a tooth thickness of the other external teeth. In FIG. 2, a solid line represents an outer shape of the external teeth 57' and an alternate long and two short dashes line represents an outer shape of the other external teeth. With the external teeth 57' having a lessened tooth thickness, a tooth plane 57", which is one of the two tooth planes located on the end side, is cut and an inclined surface TM is formed on a tooth root side of the cut tooth plane while a circular-arc surface EM continuing from the inclined surface TM is formed on a tooth tip side.

The inclined surface TM is, as is shown in FIG. 3, a plane parallel to a flat surface S containing all tangential lines to a pitch circle (indicated by an alternate long and short dash line in the drawing) of one of the two tooth planes of the external tooth 57 having a large tooth thickness and situated adjacent to the external tooth 57' having a lessened tooth thickness located on the side of the external tooth 57' having a lessened tooth thickness. In this embodiment, θ is given as an angle (hereinafter, referred to as an inclined angle) yielded between the flat surface S and a center line C of the circular-arc surface in which the external teeth 57 and 57' are formed. Also, r1 is given as a curvature radius of the circular-arc surface EM.

According to the configuration as above, the following advantages can be obtained.

(1) Of the external teeth 57 of the pawl 33, the n1 external teeth 57' from the end are formed in such a manner that a tooth thickness (tooth thickness in the chord direction on the same circumference) is lessened more toward the tooth tip in comparison with a tooth thickness of the other external teeth. The external tooth 57' having a lessened tooth thickness is cut in the tooth plane 57", which is one of the two tooth planes located on the end side, and the inclined surface TM is formed on the tooth root side of the cut tooth plane. The inclined surface TM is a plane parallel to the flat surface S containing all the tangential lines to the pitch circle of one of the two tooth planes of the external tooth 57 having a large tooth thickness and situated adjacent to the external tooth 57' having a lessened tooth thickness located on the side of the external tooth 57' having a lessened tooth thickness. Owing to this configuration, an angle yielded between the cut tooth plane 57" of the external tooth 57' at the end of the pawl 33 and a moving direction of the pawl 33 is increased. That is to say, a component force to the moving direction of the pawl 33 is increased for an input to the external teeth 57' at and near the end of the pawl 33 from the internal teeth 23 of the ratchet plate 21. Hence, the meshing state of the external teeth 57' of the pawls 33 and the internal teeth 23 of the ratchet plate 21 is released more smoothly, that is, ease of coming off of the pawls 33 from the ratchet plate 21 is enhanced and therefore a better operational feeling is obtained.

(2) Also, the inclined surface TM is formed on the tooth root side of the cut tooth plane 57' and the circular-arc surface EM continuing from the inclined surface TM is formed on the tooth tip side. Owing to this configuration, energy is not released abruptly when the pawls 33 come off and therefore the bawls 33 do not undergo rough motion. Hence, a releasing sound is reduced.

It should be appreciated that the invention is not limited to the embodiment described above. In the embodiment above, the ratchet plate 21 is installed on the seat back side and the base plate 25 is installed on the seat cushion side. However, it may be configured inversely in such a manner that the base plate 25 is installed on the seat back side and the ratchet plate 21 is installed on the seat cushion side.

Also, the reclining apparatus of the embodiment above is configured in such a manner that the external teeth and the internal teeth mesh with each other when the pawls 33 are moved linearly in the radial direction of the axis of relative rotation by the guides 25c. However, it may be configured alternatively in such a manner that the external teeth and the internal teeth mesh with each other as the pawls rotate about the own supporting points.

The inventor of the invention conducted the following experiment to confirm the advantages of the invention.

Figure 8:
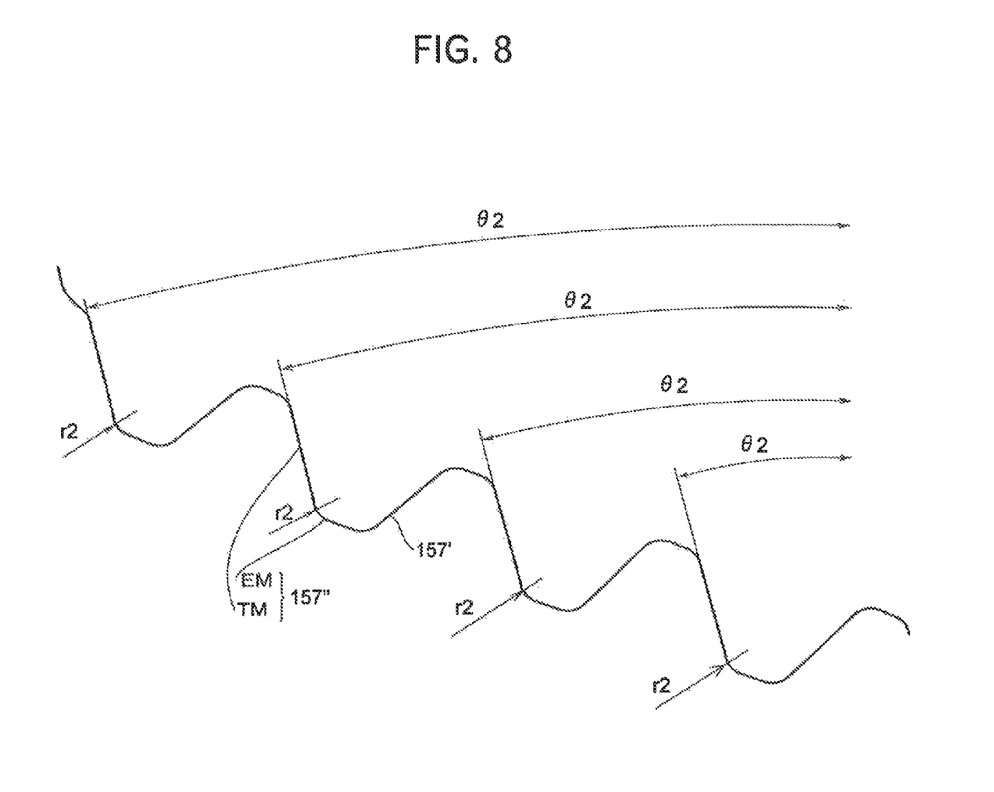
FIG. 8 is a view used to describe external teeth of the pawl according to another embodiment.
Figure 9:
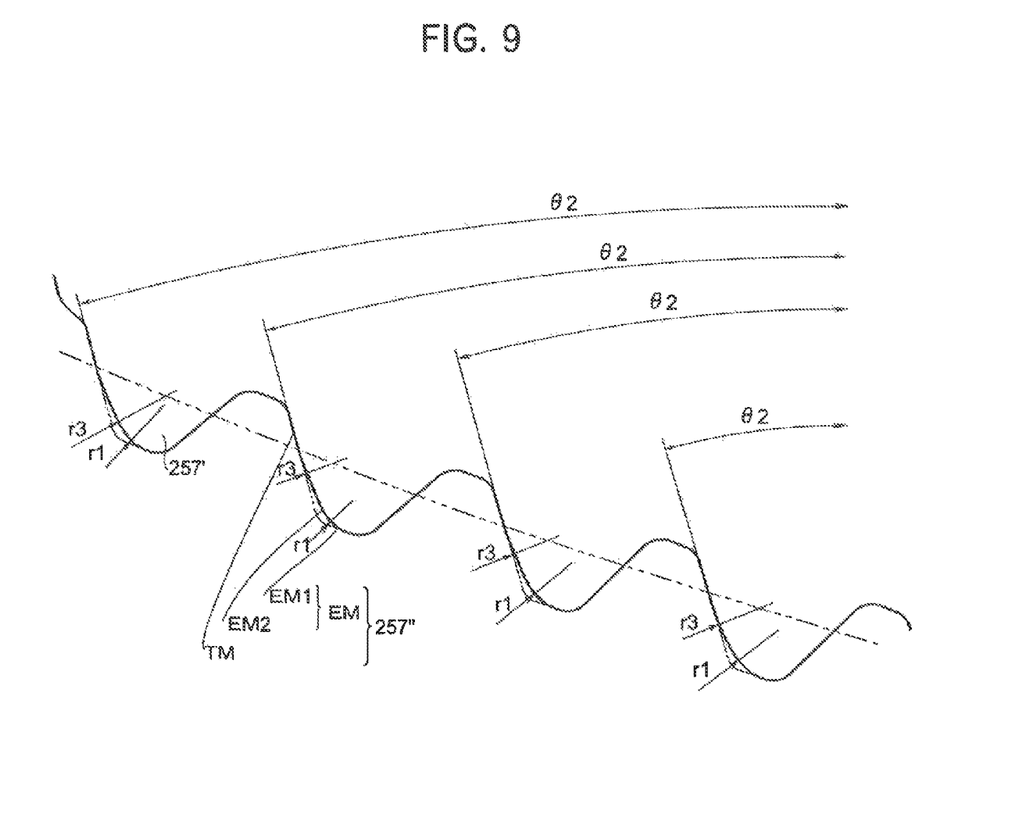
FIG. 9 is a view used to describe external teeth of the pawl according to still another embodiment.

Besides the external teeth 57' at and near the end of the pawl 33 of the shape shown in FIG. 2, external teeth of shapes as shown in FIG. 8 and FIG. 9 were prepared.

Referring to FIG. 8, of the external teeth of the pawl 33, n2 (n2<n1) external teeth 157' from the end were given with θ2 (θ2<θ1) as an inclined angle of the inclined surface TM in a cut tooth plane 157" and r2 (r2<r1) as a curvature radius of the circular-arc surface EM formed continuously from the inclined surface TM on the tooth tip side.

Referring to FIG. 9, of the external teeth of the pawl 33, n2 (n2<n1) external teeth 257' from the end were given with 02 as an inclined angle of the inclined surface TM of a cut tooth plane 257" and the circular-arc surface EM formed continuously from the inclined surface TM on the tooth tip side is formed of two circular-arc surfaces. One of the two circular-arc surfaces is a first circular-arc surface EM1 continuing from the inclined surface TM and given with r3 (r3>r1>r2) as a curvature radius and the other one is a second circular-arc surface EM2 formed on the tooth tip side continuously from the first circular-arc surface EM1 and given with r1 as a curvature radius.

Variances of a load in a tangential direction to the tooth plane with a change of an input point to the external teeth 57' shown in FIG. 2, the external teeth 157' shown in FIG. 8, the external teeth 257' shown in FIG. 9, and the external teeth 57 that were not cut in the tooth planes were examined. The result is set forth in FIG. 10.

Figure 10:
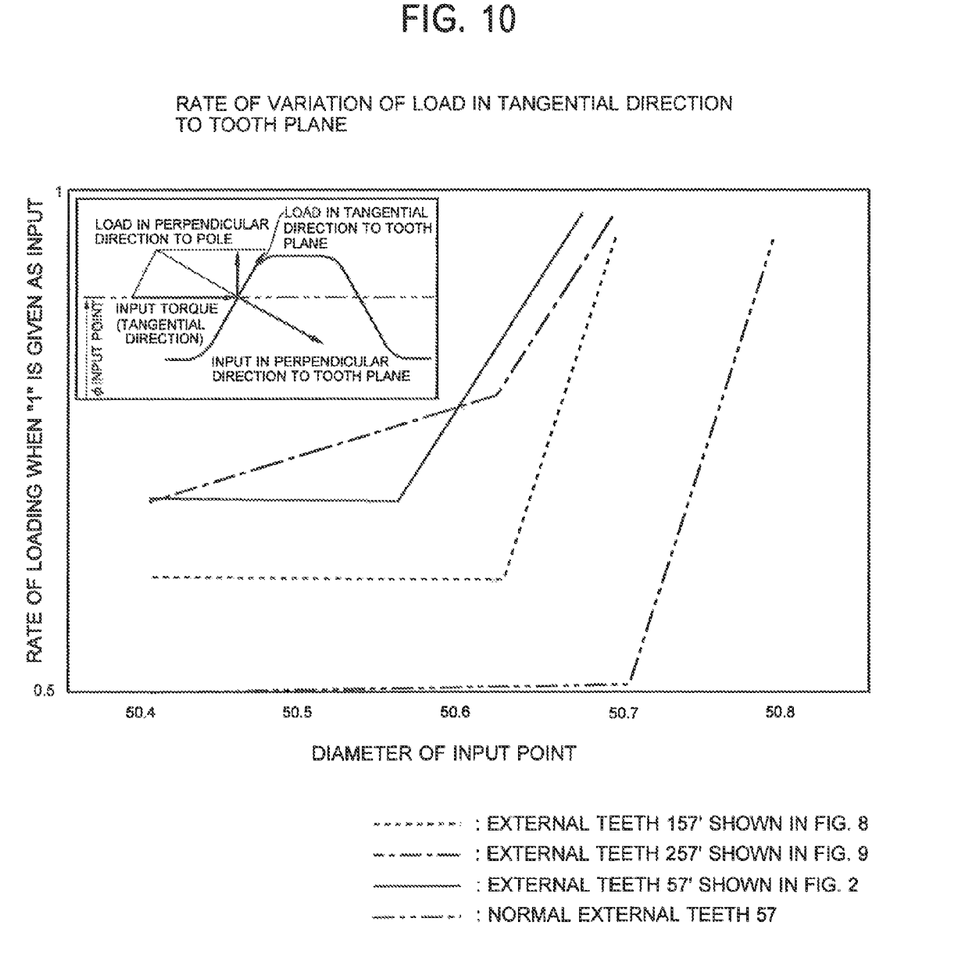
FIG. 10 is a view showing variances of a load in a tangential direction to a teeth plane of the pawl when an input point is changed.

In the drawing, the abscissa is used for a diameter of the input point. When the pawls 33 are forced to move to the unlocked position, contact points between the tooth planes 57 of the external teeth 57 and the tooth planes of the internal teeth 23 also move in the direction to the tooth tip. More specifically, a diameter of the input points to the external teeth 57 of the pawl 33 from the internal teeth 23 of the ratchet plate 21 is increased.

Also, the ordinate is used for a rate of loading in the tangential direction to the tooth plane when "1" is given as an input. Of a load in the tangential direction to the tooth plane, a load in a perpendicular direction to the pawl is given as a component force in the moving direction of the pawls 33.

In the drawing, an alternate long and two short dashes line represents the external teeth 57 that are not cut in the tooth planes, a solid line represents the external teeth 57' shown in FIG. 2, an alternate long and short dash line represents the external teeth 257' shown in FIG. 9, and a broken line represents the external teeth 157' shown in FIG. 8.

As is shown in the drawing, with the external teeth 57 that are not cut in the tooth planes and indicated by an alternate long and two short dashes line, when the pawls 33 are forced to move in the unlocking direction, a load in the perpendicular direction to the pawl (load in the tangential direction to the tooth plane) at a rate of loading of about 0.5 is generated until a diameter of the input point reaches about 50.7. Also, when the diameter of the input point reaches or exceeds about 50.7, the load in the perpendicular direction to the pawl (load in the tangential direction to the tooth plane) increases sharply. That is to say, energy is released abruptly when the pawls 33 come off.

With the external teeth 157' of FIG. 8 indicated by a broken line, when the pawls 33 are forced to move in the unlocking direction, a load in the perpendicular direction to the pawl (load in the tangential direction to the tooth plane) at a rate of loading of about 0.6 is generated until a diameter of the input point reaches about 50.6. In short, ease of coming off of the pawls is more enhanced than in a case where the tooth planes are not cut at all. When the diameter of the input point reaches or exceeds about 50.6, the load in the perpendicular direction to the pawl (load in the tangential direction to the tooth plane) increases sharply. However, the generated load in the perpendicular direction to the pawl increases so sharply that energy is released abruptly when the pawls 33 come off.

With the external teeth 57' of FIG. 2 indicated by a solid line, when the pawls 33 are forced to move in the unlocking direction, a load in the perpendicular direction to the pawl (load in the tangential direction to the tooth plane) at a rate of loading of about 0.7 is generated until a diameter of the input point reaches about 50.6. In short, ease of coming off of the pawls is more enhanced than in a case where the tooth planes are not cut at all. When the diameter of the input point reaches or exceeds about 50.6, the load in the perpendicular direction to the pawl (load in the tangential direction to the tooth planes) increases sharply. However, the generated load in the perpendicular direction to the pawl increases more gently than those generated with the normal uncut external teeth 57 and the external teeth 157' shown in FIG. 8. Hence, energy is not released abruptly when the pawls 33 come off.

With the external teeth 257' of FIG. 9 indicated by an alternate long and short dash line, when the pawls 33 are forced to move in the unlocking direction, a rate of loading increases gently from about 0.7 to about 0.8 until a diameter of the input point reaches about 50.6. That is to say, ease of coming off of the pawls is more enhanced than in a case where the tooth planes are not cut at all. When the diameter of the input point reaches or exceeds about 50.6, the load in the perpendicular direction to the pawl (load in the tangential direction to the tooth plane) increases sharply. However, the generated load in the perpendicular direction to the pawl increases more gently than those generated with the normal uncut external teeth 57 and the external teeth 157' shown in FIG. 8. Hence, energy is not released abruptly when the pawls 33 come off.

What is claimed is:

1. A reclining apparatus, comprising:
    a base plate;
    a ratchet plate that is placed on the base plate in a rotatable manner and provided with a recess portion including a circular-arc surface about a center axis of rotation in a surface opposing the base plate, internal teeth being formed in the circular-arc surface of the recess portion in a circumferential direction;
    a pawl that is disposed in the recess portion of the ratchet plate and provided with a plurality of external teeth in a surface opposing the circular-arc surface so as to mesh with the internal teeth, at least one of the plurality of external teeth from an end side of the pawl being formed in such a manner that a tooth thickness is lessened more toward a tooth tip in comparison with a tooth thickness of other external teeth; and
    a guide that is provided to the base plate to guide the pawl from a locked position at which the external teeth mesh with the internal teeth to an unlocked position at which the external teeth do not mesh with the internal teeth and vice versa,
    wherein the at least one of the plurality of external teeth, having the lessened tooth thickness, has an inclined surface located along an external face of the pawl, which is formed by cutting one tooth plane, and which is located on the end side of the pawl of two tooth planes of the external teeth, the two tooth planes creating inclined surfaces along sides of the at least one of the plurality of external teeth, and
    wherein the inclined surface of the at least one of the plurality of external teeth having the lessened tooth thickness is parallel to a flat surface, which contains all tangential lines along a tooth plane of a tooth having a larger tooth thickness, at an intersection of the one tooth plane and a pitch circle of the tooth having the larger tooth thickness, the one tooth plane being adjacent to the at least one of the plurality of external teeth having the lessened tooth thickness.

2. The reclining apparatus according claim 1, wherein the inclined surface is formed on a tooth root side of said one tooth plane that is cut, and
    wherein a circular-arc surface continuing from the inclined surface is formed on a tooth tip side.

3. The reclining apparatus according to claim 2, wherein the circular-arc surface includes a first circular-arc surface continuing from the inclined surface and a second circular-arc surface formed on the tooth tip side so as to continue from the first circular-arc surface and given with a curvature radius smaller than a curvature radius of the first circular-arc surface.

\* \* \* \* \*